T. H. WINDLE.
Bee Hive.
No. 21,163.  Patented Aug. 10, 1858.
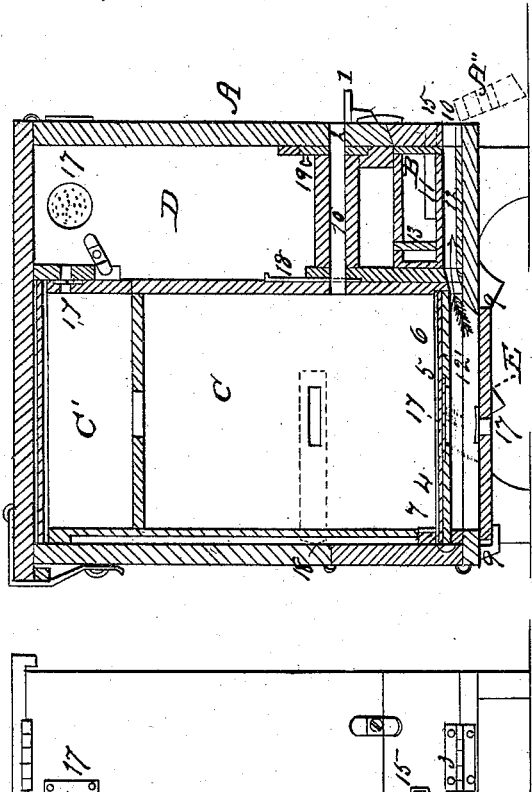
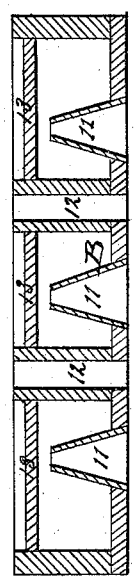
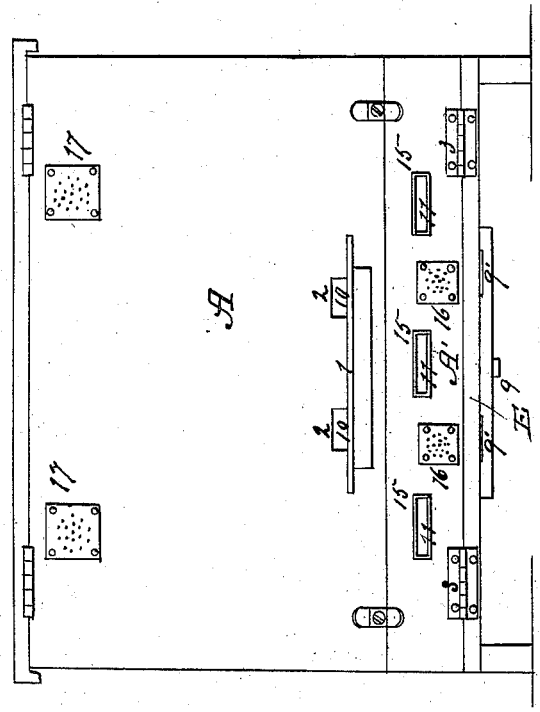
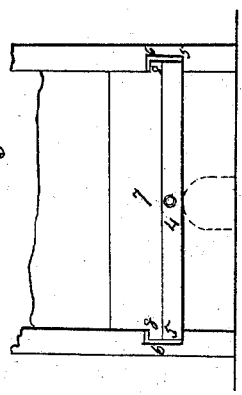
WITNESSES
Henry G. Hoovens
Norris M. Hunnum
INVENTOR
Thomas H. Windle

UNITED STATES PATENT OFFICE.

THOMAS H. WINDLE, OF WAGONTOWN, PENNSYLVANIA.

BEEHIVE.

Specification of Letters Patent No. 21,163, dated August 10, 1858.

*To all whom it may concern:*

Be it known that I, THOMAS H. WINDLE, of Wagontown, in the county of Chester and State of Pennsylvania, have invented a new and useful Improvement in Beehives; and I do hereby declare that the following is a full, clear, and exact description of the construction and operation of the same, reference being had to the accompanying drawings, making a part of this specification, in which—

Figure 1, represents a front elevation of the improved hive; Fig. 2, a vertical transverse section of the same, through one of the bee apartments; Fig. 3, a sectional front of one of the said apartments; Fig. 4, a front view of the moth-trap; and Fig. 5, a horizontal section of the same, like letters, in the several figures, indicating the same objects.

My invention has for its object the better protection and preservation of the bees, and the products of their labor, by preventing the depredations of moths.

It consists in a peculiar mode of constructing and arranging the moth-trap, and a self-cleaning sliding-bottom to each of the sections of the bee apartments, so that the moths and their deposits may be more effectually secured and removed from the hive, without damage either to the bees or the apiarist.

In the drawings, A, is the front wall of the hive, which is a rectangular box supported upon feet and having its top and back walls made to turn upon hinges so that they can be either opened outwardly, or secured closely together, from the rear of the same and out of reach of the bees. The front (A) is provided with an alighting board, 1, and entrance-holes, 2—2, for the bees, in the usual manner; and also with a fall, A', which turns outwardly, upon hinges, 3—3, and allows the moth-trap, which is immediately behind it, to be withdrawn as occasion may require. The bee apartments C and C', are made in rectangular sections and placed side by side across the back part of the interior of the hive in the usual manner, but they are made of less depth than heretofore, or so as to leave the large air space, D, between them and the front wall of the hive.

Near the lower end of each of the larger apartments (C) there is provided a horizontally sliding bottom, 4, which has a piece of tin plate, 5, fastened on each of its side edges and bent inwardly, at a right angle, near its upper edge, so as to form a groove, 6, between the said edge and the slide, for the moth to deposit its eggs in. Two grooves are made in the inner sides of the apartment (C), for the accurate insertion of this slide (4); and the upper front-piece (7) of the apartment is made with tongues 8—8, which fit into the grooves (6—6) formed by the tins (5—5) on the slide (4) as described, and is also lined on the inside with a piece of tin plate secured thereto so as to fit accurately against the upper side of the said slide, and also, by tongues, into the grooves (6—6), so that as the said slide (4) is withdrawn, the tin plate shall scrape the grooves (6—6), and remove therefrom any dirt or deposits that may have fallen, or been deposited or cemented thereon, or in the grooves (6—6), by the moths. A short distance below these slides (4) there is a fall piece, E, secured to the bottom of the hive, by means of a hook or button, 9, and hinges, 9', which catches whatever may have been removed from the slides (4) as described, and discharges the same from the hive whenever the said piece (E) is let fall.

The bee entrances, 2—2, connect with their respective apartments (C) by means of the tubular ways (10—10) which are fixed across the air-space (D).

The moth-trap (B) is a long narrow box provided with tapering, tin tubes, 11—11—11, open at each end and fixed horizontally across it so as to open in mid-space within the same; and is also provided with the intermediate horizontal tubes, 12—12, so arranged that when the trap (B) is inserted as seen in Fig. 2, these tubes (12—12) shall respectively open (through holes provided for the purpose) into the spaces, 12', which are below the slides (4) of the said apartments (C). The back piece (13) of the trap (B) is made so as to be lifted out to permit the moths, &c., to be removed from the trap, as occasion may require; and the front fall (A') is provided with the open holes, 15—15—15, directly opposite to the larger ends of the tin tubes (11—11—11); and also with the ventilating holes, 16—16, (covered with perforated tin plates) which are directly opposite to the front ends of the tubes (12—12) in the trap. Ventilating holes, 17—17, (covered with perforated tin plates) are also made through the front and ends of the upper part of the hive, and through the fronts of the upper bee-apartments (C') also, so as to communicate with the air space (D); and like vents are also made through the fall (E) and the slides (4).

Adjustable slides, 18—18, are provided for each of the larger apartments (C) so as to enable the apiarist to separate and remove any section of them with perfect safety; and also an adjustable slide, 19, is provided, whereby he can shut off either, or both of the bee entrances (2—2) as occasion may require.

Operation: The walls of the hive being closed and secured together as seen in Figs. 1 and 2, and the perforations in the tin plates which cover the vent-holes (16 and 17) being very small, there is therefore left no opening whereby a moth can enter the hive, except the bee entrances (2—2) and those to the moth trap (15—15—15); and as the bee entrances are generally occupied by the bees the moths can readily enter only by the openings (15—15—15), and by so doing become entrapped, because the shape and position of the inner openings of the tin tubes (11—11—11) are such that a moth cannot return through them; nor can it attain to any other part of the hive, but is confined within the trap until it dies, or is removed by apiarist. But suppose a moth should pass through the bee opening (2—2) and deposit its eggs in the interior apartments into which the opening leads. If deposited in the upper part of the apartment (C), the bees will cut them loose and they will fall upon the slide (4); and if deposited on the said slide, or around on the grooves (6—6) thereof they will be readily and perfectly removed by simply withdrawing the said slide (4), because the tin plate on the inner side of the front-piece (7) fits transversely (across) in contact with its upper side and into the grooves (6—6); and therefore the slides are self cleaning by the act of withdrawing. Whatever is thus scraped off the slide, drops down upon the fall (E), and the said slide is then pushed in again to its place. If any of the living bees should descend, or fall with the dirt and be excluded from the apartment by the return of the slide, they can escape through the tubular way (12) in the direction of the arrow (Fig. 2), the front fall (A') being previously let down to the position shown by the dotted lines A'', after which the fall (E) is let go and the dead moths and their eggs with whatever dirt, dead bees, &c., may be thereon, discharged.

The air space (D), extending across the whole front of the hive, and being perfectly ventilated by the openings 16 and 17, prevents the transmission of heat, by the direct rays of the sun, to the interior apartments (C and C'), be they in number greater or less, and thus preserves the combs from melting, and incidentally affords easy access for working the slides, 18 and 19; and the hives being, generally, arranged closely beside each other in the apiary, an air space is not required entirely across their ends; but for a lone, or isolated hive, such an air space will be produced across the ends also, by leaving out the two end sections of the bee apartments.

I am aware that beehives have been made with a moth trap attached, and also with sections of separate bee apartments arranged together and communicating with each other, and having ventilating holes therein substantially as herein described; therefore I do not claim, broadly, either of these devices and arrangements; but

What I claim as my invention and desire to secure by Letters Patent, is confined to the following, viz:

1. I claim the combined arrangement, in the moth trap (B), of the tapering moth tubes (11—11—11) and the ventilated bee-escape tubes (12—12), when the same is used in combination with the hive the whole being constructed and arranged substantially in the manner and for the purposes set forth and described.

2. I also claim making each of the larger bee apartments (C) with the self-cleaning slide (4), the said slide being constructed as described and applied in connection with the tongued piece (7) so as to operate substantially in the manner and for the purpose set forth and described.

THOMAS H. WINDLE.

Witnesses:
HENRY G. THOMAS.
NORRIS M. HANNUM.